(12) United States Patent
Simon et al.

(10) Patent No.: US 11,985,985 B2
(45) Date of Patent: May 21, 2024

(54) OUTDOOR COOKING STATION FOR SMOKING FOOD AND METHOD THEREOF

(71) Applicant: North Atlantic Imports, LLC, Logan, UT (US)

(72) Inventors: Paul J. Simon, Elizabethtown, KY (US); Michael R. Giebel, Joplin, MO (US)

(73) Assignee: North Atlantic Imports, LLC, Logan, UT (US)

( * ) Notice: Subject to any disclaimer, the term of this patent is extended or adjusted under 35 U.S.C. 154(b) by 68 days.

(21) Appl. No.: 17/385,881

(22) Filed: Jul. 26, 2021

(65) Prior Publication Data

US 2022/0046937 A1 Feb. 17, 2022

Related U.S. Application Data

(60) Provisional application No. 63/057,235, filed on Jul. 27, 2020.

(51) Int. Cl.
| | | |
|---|---|---|
| A23B 4/052 | (2006.01) | |
| A23L 5/10 | (2016.01) | |
| A47J 37/07 | (2006.01) | |

(52) U.S. Cl.
CPC .............. *A23B 4/0523* (2013.01); *A23L 5/17* (2016.08); *A47J 37/0704* (2013.01); *A47J 37/0786* (2013.01)

(58) Field of Classification Search
CPC .................................................. A23B 4/0523
See application file for complete search history.

(56) References Cited

U.S. PATENT DOCUMENTS

| | | | |
|---|---|---|---|
| 4,823,684 A | | 4/1989 | Traeger et al. |
| 5,069,196 A | * | 12/1991 | Schlosser ............ A47J 37/0786 |
| | | | 126/25 R |
| 5,183,028 A | | 2/1993 | Traeger et al. |
| 5,251,607 A | | 10/1993 | Traeger et al. |
| 6,131,505 A | | 10/2000 | Lin |
| 7,231,917 B2 | | 6/2007 | Frederiksen |
| 7,757,604 B2 | | 7/2010 | Gonzalez |
| 8,931,400 B1 | | 1/2015 | Allen |
| 9,289,096 B2 | | 3/2016 | Barkhouse et al. |
| 9,635,978 B2 | | 5/2017 | Measom et al. |
| 9,693,569 B2 | | 7/2017 | Wingerd et al. |
| 9,759,429 B2 | | 9/2017 | Tucker |
| 9,814,354 B2 | | 11/2017 | McAdams et al. |
| 9,930,991 B2 | | 4/2018 | Traeger |
| 10,045,546 B2 | | 8/2018 | Giebel et al. |
| 10,105,007 B2 | | 10/2018 | Colston et al. |
| 10,158,720 B2 | | 12/2018 | Colston et al. |

(Continued)

FOREIGN PATENT DOCUMENTS

| | | | |
|---|---|---|---|
| KR | 101635714 B1 | * | 7/2016 |
| WO | WO2016153547 | | 9/2016 |

*Primary Examiner* — John J Norton
*Assistant Examiner* — Franklin Jefferson Wang
(74) *Attorney, Agent, or Firm* — David L. Stott

(57) ABSTRACT

Embodiments of an outdoor cooking station with a cooking chamber configured to be heated with smoke. The outdoor cooking station includes a pivoting hood to move the hood between closed and open positions. In one embodiment, upon the hood being in the closed position, the hood includes a vertically oriented surface with openings to vent the heated smoke.

14 Claims, 7 Drawing Sheets

(56) References Cited

U.S. PATENT DOCUMENTS

| | | |
|---|---|---|
| 10,213,051 B2 | 2/2019 | Colston et al. |
| 10,218,833 B2 | 2/2019 | Colston |
| 10,222,092 B1 | 3/2019 | Traeger |
| 10,292,531 B1 | 5/2019 | Hancock et al. |
| 10,426,295 B2 | 10/2019 | McAdams et al. |
| 10,455,022 B2 | 10/2019 | Colston |
| 10,455,979 B2 | 10/2019 | Colston et al. |
| 10,491,738 B2 | 11/2019 | Colston |
| 10,568,461 B2 | 2/2020 | Colston et al. |
| 10,652,386 B2 | 5/2020 | Colston |
| 10,660,474 B2 | 5/2020 | Gafford |
| 10,674,866 B2 | 6/2020 | Colston |
| 10,701,199 B2 | 6/2020 | Colston |
| 10,708,409 B2 | 7/2020 | Colston |
| 10,711,995 B2 | 7/2020 | Traeger |
| 10,729,283 B2 | 8/2020 | McAdams et al. |
| 10,735,523 B2 | 8/2020 | Colston |
| 10,735,575 B2 | 8/2020 | Colston |
| 10,806,301 B2 | 10/2020 | Hancock et al. |
| 11,350,791 B2 * | 6/2022 | Colston ............... A47J 37/0704 |
| 2002/0189603 A1 | 12/2002 | Hsu |
| 2004/0200394 A1 | 10/2004 | Krumrei |
| 2004/0226550 A1 * | 11/2004 | Hutton .................. A23B 4/052 |
| | | 126/25 R |
| 2004/0255926 A1 | 12/2004 | Waits et al. |
| 2005/0098169 A1 | 5/2005 | Frederiksen |
| 2007/0175467 A1 | 8/2007 | Liu |
| 2007/0215021 A1 | 9/2007 | Krumrei |
| 2008/0078374 A1 | 4/2008 | Polkinghorn et al. |
| 2009/0038603 A1 | 2/2009 | Hepper et al. |
| 2009/0183729 A1 | 7/2009 | Barkhouse et al. |
| 2011/0219958 A1 | 9/2011 | Noble |
| 2011/0271947 A1 * | 11/2011 | Nilssen, II .......... A47J 37/0704 |
| | | 126/1 R |
| 2011/0271949 A1 | 11/2011 | Ortner et al. |
| 2012/0288596 A1 * | 11/2012 | Holdo Baggott ......... A23L 5/15 |
| | | 426/235 |
| 2013/0008427 A1 * | 1/2013 | Ahmed ............... A47J 37/0704 |
| | | 126/39 B |
| 2013/0011535 A1 | 1/2013 | Mafi |
| 2013/0228161 A1 * | 9/2013 | Ahmed ............... A47J 37/0754 |
| | | 126/25 R |
| 2014/0067649 A1 | 3/2014 | Kannan et al. |
| 2014/0154381 A1 | 6/2014 | Mafi |
| 2014/0326232 A1 | 11/2014 | Traeger |
| 2015/0144238 A1 | 5/2015 | Traeger |
| 2016/0037966 A1 | 2/2016 | Chin et al. |
| 2016/0198896 A1 * | 7/2016 | Turner ................ A47J 37/0623 |
| | | 99/446 |
| 2017/0065124 A1 | 3/2017 | Colston |
| 2017/0095106 A1 | 4/2017 | Cook |
| 2017/0164783 A1 | 6/2017 | Sauerwein et al. |
| 2017/0238758 A1 | 8/2017 | Rummel et al. |
| 2018/0168397 A1 | 6/2018 | Colston |
| 2018/0213974 A1 | 8/2018 | Mafi |
| 2019/0133374 A1 | 5/2019 | McAdams et al. |
| 2019/0150663 A1 | 5/2019 | Colston et al. |
| 2019/0277507 A1 | 9/2019 | Colston et al. |
| 2019/0290064 A1 | 9/2019 | Colston et al. |
| 2019/0290066 A1 | 9/2019 | Colston |
| 2019/0290069 A1 | 9/2019 | Colston et al. |
| 2019/0335949 A1 | 11/2019 | Simon et al. |

* cited by examiner

OUTDOOR COOKING STATION FOR SMOKING FOOD AND METHOD THEREOF

CROSS-REFERENCE TO RELATED APPLICATIONS

This application claims the benefit of U.S. Provisional Application No. 63/057,235, filed Jul. 27, 2020, the disclosure of which is hereby incorporated by reference herein in its entirety.

TECHNICAL FIELD

The present invention relates generally to outdoor cooking stations and, more specifically, the present invention relates to smoker type outdoor cooking stations.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

A griddle is a cooking device consisting of a broad flat surface that can be heated using a variety of means and is used in both residential and commercial applications for a variety of cooking operations. The griddle is most commonly a flat metal plate composed of cast or wrought iron, aluminum or carbon steel. Griddles are commonly heated directly or indirectly by open flame or electrical elements. Using a griddle placed directly on a barbeque grill or over flame burners has also become popular when cooking foods not as well suited for cooking directly on a grill over an open flame.

Further, another mode for grilling that imparts unique flavors to food is by generating heated smoke to the grill, often called a "smoker." Some smoker devices generate the heated smoke by using pellets as a fuel source. Typically, the pellets are delivered to a fire pot with an auger within the smoker device. The auger typically sits in a horizontal position to move the pellets into the fire pot for burning and generating heated smoke to a cooking chamber. Smoker devices using pellets are popular because of the variety of flavored pellets available and the ability to pre-program the temperature and time period for the smoker device to cook the food, thereby, allowing the user to be less attentive to the food being cooked by the smoker device.

BRIEF SUMMARY OF THE INVENTION

The present invention is directed to various embodiments of an outdoor cooking station configured to be heated with smoke. In one embodiment, the outdoor cooking station includes a main body and a hood. The main body extends to define a front side, a rear side, a left side and a right side each extending from a lower end to a cooking chamber. The cooking chamber is an upper portion of the main body such that the cooking chamber includes a cooking surface. The main body includes a heat generating portion sized and configured to burn fuel to provide heated smoke to the cooking chamber. Further, the main body includes a radial wall extending above and at least partially over the cooking surface. The hood is rotatably coupled to the main body so as to be moveable along the radial wall between an open position and a closed position. The hood includes a rear edge having a vent portion with openings defined therein, the vent portion sized and configured to facilitate venting smoke from the cooking chamber.

In another embodiment, the radial wall of the main body defines an axis and the hood pivots about a pivot axis, the axis being co-axial with the pivot axis. In another embodiment, the rear edge includes a surface with the openings defined therein such that, upon the hood being in the closed position, the surface extends in a substantially vertical orientation. In another embodiment, the substantially vertical orientation of the surface includes an angle of about 1 to 15 degrees relative to the vertical. In still another embodiment, the rear edge includes a surface with the openings defined therein such that, upon the hood being in the closed position, the surface faces rearward with a substantially vertical orientation and, upon the hood being in the open position, the surface faces downward with a substantially horizontal orientation.

In another embodiment, upon the hood being in the closed position, the rear edge of the hood extends between the first and second sides of the main body such that the rear edge extends directly over a top portion of the radial wall. In another embodiment, the openings defined in the rear edge are adjustable relative to a size of the openings. In still another embodiment, the hood extends with a radially extending outer wall and a radially extending inner wall so as to define an air gap between the outer wall and the inner wall.

In another embodiment, the heat generating portion includes a pellet feeding system coupled to the main body. In still another embodiment, the cooking surface within the cooking chamber includes a grill type surface. In yet another embodiment, the cooking surface within the cooking chamber includes a main grill rack and an upper grill rack, the upper grill rack being moveable between a horizontal position and a pivoted position.

In accordance with another embodiment of the present invention, an outdoor cooking station configured to be heated with smoke is provided. The outdoor cooking station includes a main body and a hood. The main body extends with a barrel like structure defining an axis, the barrel like structure having a radial wall extending between two opposing end walls such that the two opposing end walls are vertically oriented. The barrel like structure includes a cooking chamber and a heat generating portion, the heat generating portion configured to burn fuel to provide heated smoke to the cooking chamber. The radial wall of the barrel like structure defines an opening therein such that the opening is defined along a front side of the barrel like structure to provide access to the cooking chamber. The hood is pivotably coupled to the main body so as to be moveable along the radial wall between an open position and a closed position. The hood includes a rear edge having a vent portion with openings defined therein, the vent portion sized and configured to facilitate venting smoke from the cooking chamber.

In another embodiment, the hood pivots about a pivot axis, the pivot axis being coaxial with the axis of the barrel like structure. In still another embodiment, the rear edge includes a surface with the openings defined therein such that, upon the hood being in the closed position, the surface extends in a substantially vertical orientation. In another embodiment, the substantially vertical orientation of the surface includes an angle of about 1 to 15 degrees relative to the vertical. In yet another embodiment, the rear edge includes a surface with the openings defined therein such that, upon the hood being in the closed position, the surface faces rearward with a substantially vertical orientation and, upon the hood being in the open position, the surface faces downward with a substantially horizontal orientation. In another embodiment, the openings defined in the rear edge are adjustable relative to a size of the openings.

In another embodiment, the hood extends with a radially extending outer wall and a radially extending inner wall so as to define an air gap between the outer wall and the inner wall. In another embodiment, the heat generating portion includes a pellet feeding system coupled to the main body. In another embodiment, the cooking chamber includes a main grill rack and an upper grill rack, the upper grill rack being moveable between a horizontal position and a pivoted position.

In accordance with another embodiment of the present invention, a method for venting a smoker cooking station is provided. The method includes the steps of: providing a main body extending to define a barrel like structure defining an axis, the barrel like structure having a radial wall extending between two opposing end walls, the two opposing end walls being oriented vertically, the barrel like structure including a cooking chamber and a heat generating portion, the heat generating portion configured to burn fuel to provide heated smoke to the cooking chamber, the radial wall of the barrel like structure defining an opening therein such that the opening is defined along a front side of the barrel like structure to provide access to the cooking chamber, the main body including a hood pivotably coupled to the main body so as to be moveable along the radial wall between an open position and a closed position, the closed position of the hood configured to close of the access to the cooking chamber; and, upon the hood being in the closed position, venting heated smoke from a rearward facing surface of the hood such that the rearward facing surface defines multiple openings therein and such that the rearward facing surface is positioned substantially vertical to minimize foreign elements from entering the multiple openings defined in the rearward facing surface.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
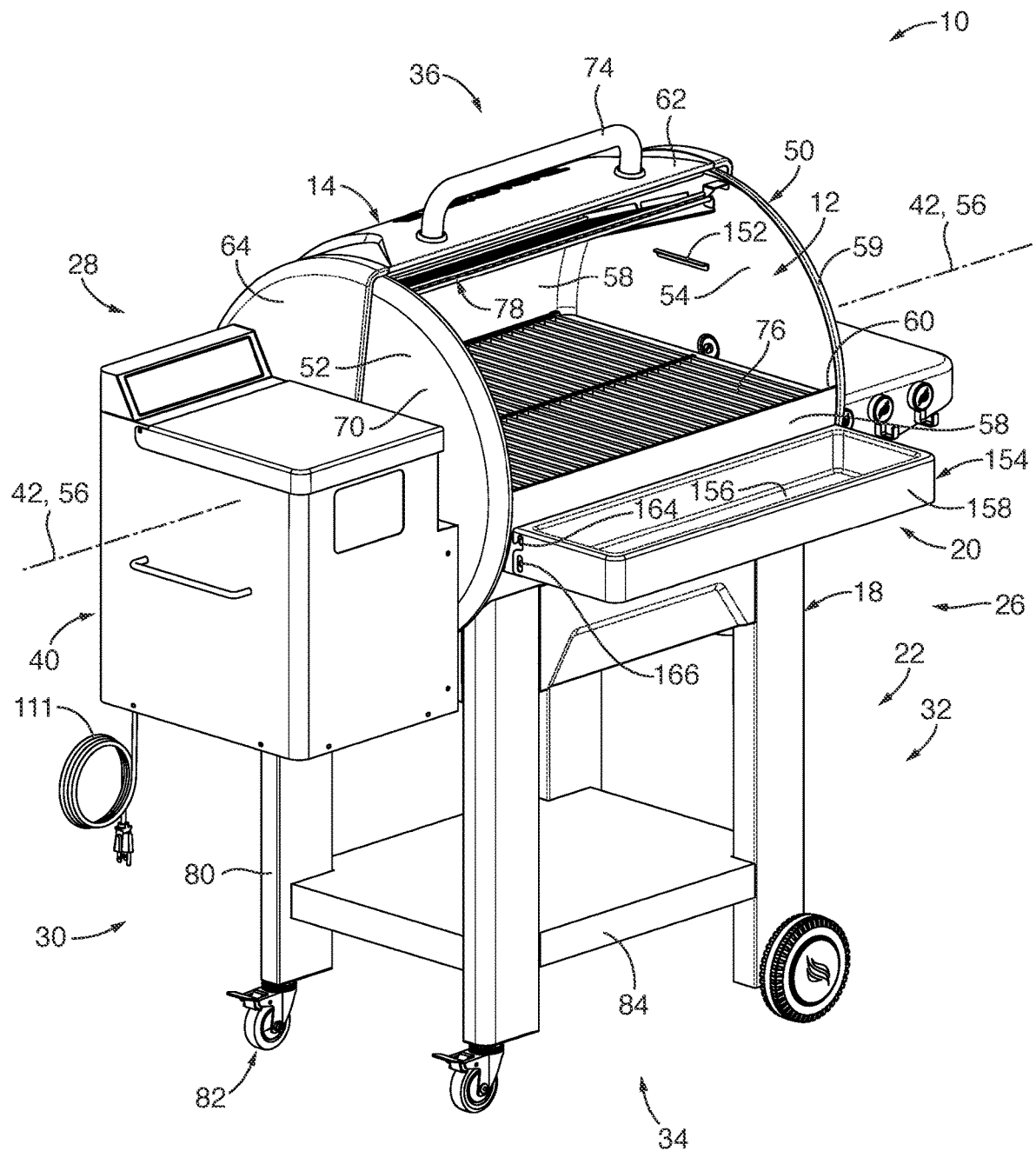
FIG. 1 is a perspective front view of a cooking station, depicting a hood pivoted to an open position with an upper rack pivoted to a pivoted position, according to an embodiment of the present invention.
Figure 2:
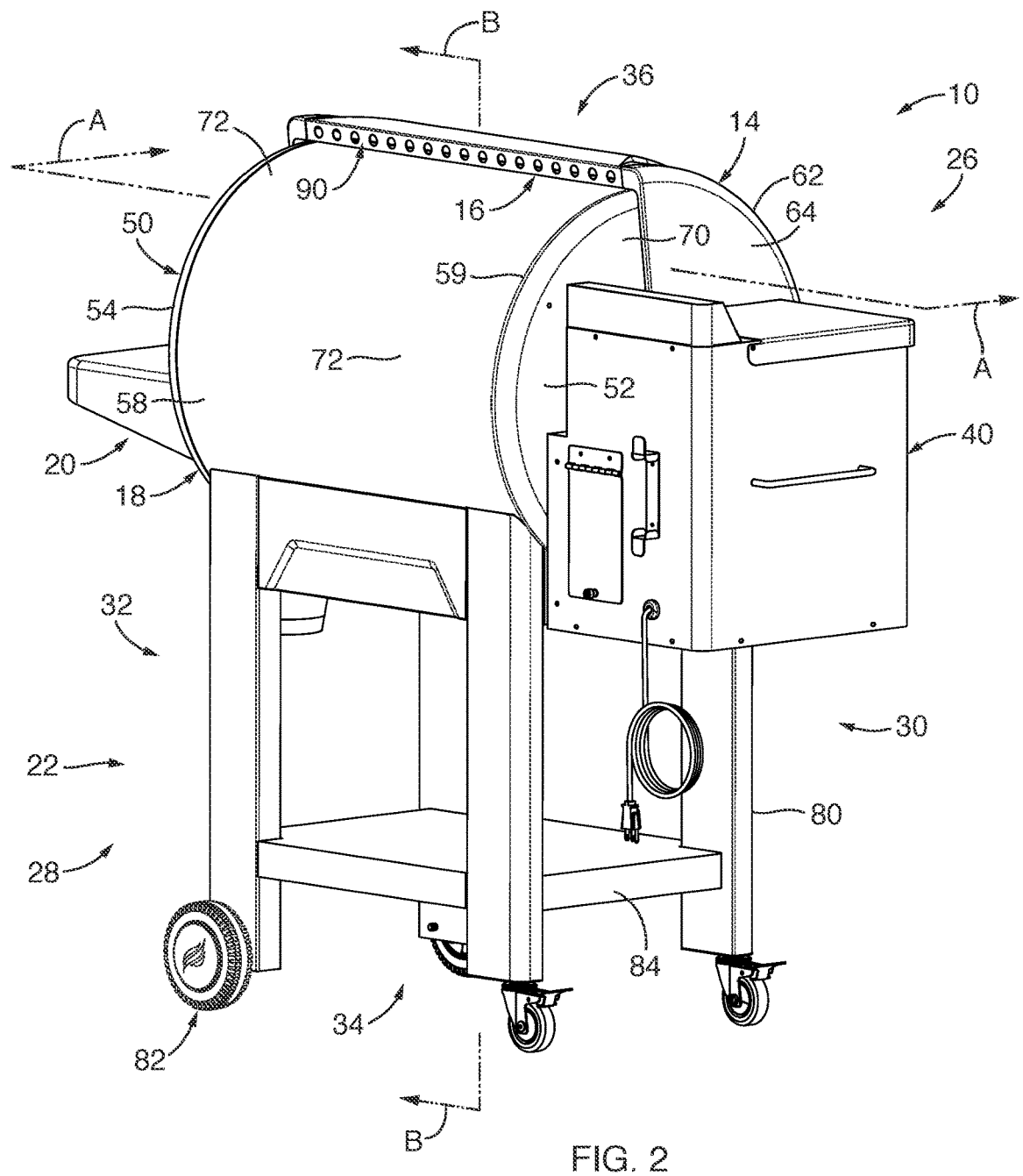
FIG. 2 is a perspective rear view of the cooking station, depicting the hood pivoted to a closed position, according to another embodiment of the present invention.

Referring to FIGS. 1 and 2, a cooking station 10 sized and configured to provide heat to a cooking chamber 12 with heated smoke is provided. Such heated smoke may be generated by burning pellets, such as flavored pellets, or any other suitable burning substance, such as wood or charcoal. The cooking station 10 may be of the type for outdoor use and may also be portable. The cooking station 10 may include a hood 14 pivotably moveable over the cooking chamber 12. The hood 14 may include a vent portion 16 defined therein sized and configured to facilitate drawing or pulling air flow through the cooking chamber 12 so as to provide an outlet for the heated smoke. Further, the vent portion 16 may be sized and configured to facilitate penetrating food with the heated smoke within the cooking chamber 12 of the cooking station 10. Further, structure of the vent portion 16 may be oriented, sized and configured to minimize foreign elements, such as rain water, from entering the cooking chamber 12 of the cooking station 10. Other additional unique features are provided in the cooking station 10, as set forth below.

Figure 7:
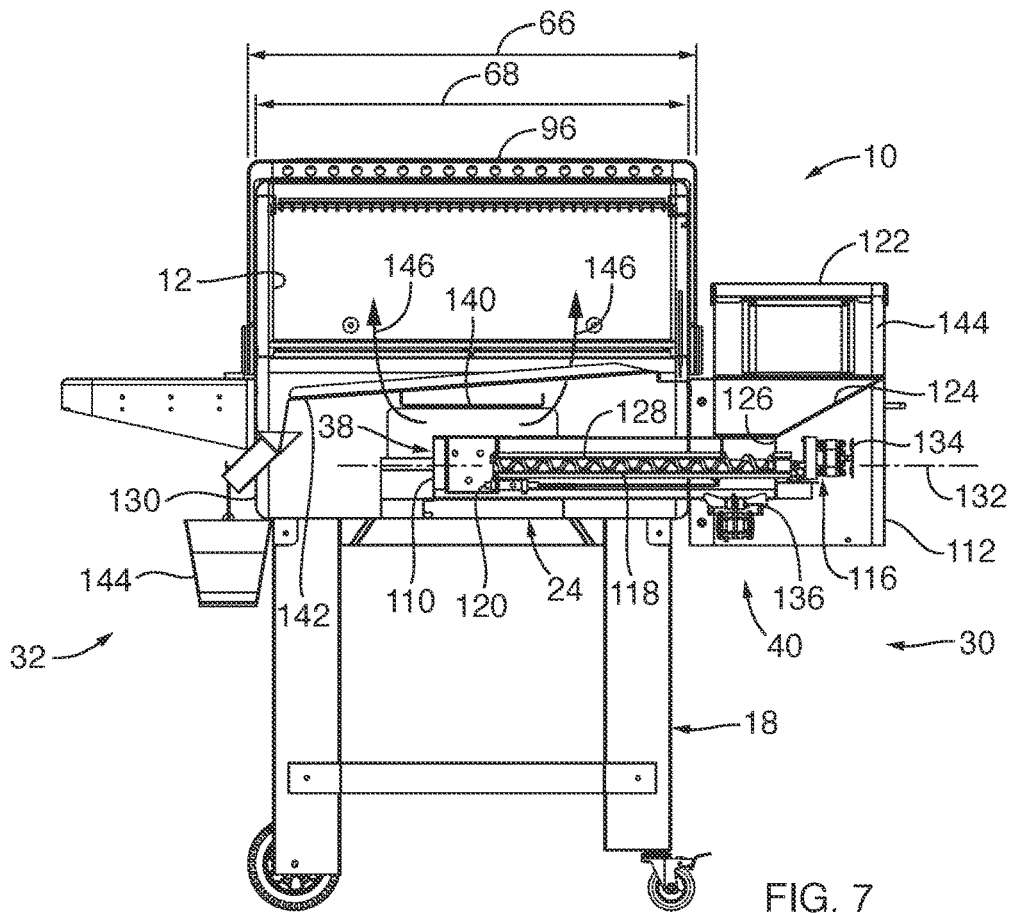
FIG. 7 is a cross-sectional view of the cooking station taken along section line A-A of FIG. 2, depicting components of a pellet feeding system of the cooking station, according to another embodiment of the present invention.

The cooking station 10 may include a main body 18 with an upper portion 20 and a lower portion 22, the upper portion defining the cooking chamber 12 and a heat generating portion 24 (FIG. 7) that may be positioned below the cooking chamber 12 of the main body 18. The main body 18 may extend between a front side 26 and a rear side 28 and may extend between a first side 30 and a second side 32. The front side 26 may be opposite of the rear side 28 and the first side 30 may be opposite the second side 32. The main body 18 may also extend between a bottom side 34 and a top side 36, the bottom side 34 being opposite the top side 36. Further, as best depicted in FIG. 7, the upper portion 20 of the cooking station 10 may include or be associated with a burning portion or the heat generating portion 24. Such burning portion may include holding structure 38 sized and configured to burn fuel and generate heated smoke, such as a bin or pot for burning wood, charcoal or pellets. In one embodiment, the holding structure 38 of the burning portion for generating heated smoke may be associated with a pellet feeding system 40, discussed in further detail herein.

Referring back to FIGS. 1 and 2, the upper portion 20 may include the hood 14, the hood 14 being moveable between a fully open position and a closed position. In the fully open position, the hood 14 may be positioned along the rear side 28 and top side 36 of the main body 18. In the closed position, the hood 14 may be positioned along the front side 26 and the top side 36 of the main body 18. The hood 14 may pivot about a pivot axis 42 (see also FIG. 4) that may be centrally located relative to and through the main body 18 so as to extend between the first and second sides 30, 32 of the main body 18. In another embodiment, there may be various open positions of the hood 14, each of which may be pivoted positions relative to and from the closed position of the hood 14.

In one embodiment, the upper portion 20 of the main body 18 may exhibit a barrel like structure 50, the barrel like structure 50 on its side with opposing first and second ends 52, 54 of the barrel like structure vertically oriented such that the first and second ends 52, 54 may extend parallel relative to each other. The barrel like structure 50 may extend to define an axis 56 that may be co-axial with the pivot axis 42 of the hood 14. In another embodiment, the pivot axis 42 may extend parallel relative to the axis 56, the axis 56 being centrally and symmetrically located or defined in the main body 18. Further, the barrel like structure 50 may extend with a radial side wall 58, the radial side wall 58 extending between the first and second ends 52, 54. Such first and second ends 52, 54 may extend with a circular structure so as to define a periphery 59, the periphery 59 extending to define a circle or oval. In one embodiment, the radial side wall 58 of the barrel like structure 50 may define a cut-out or opening 60 therein, the opening 60 facilitating access to the cooking chamber 12. Further, the hood 14 may move between the open and closed positions so as to cover the opening 60. As such, the hood 14 may extend with a radial hood wall 62 with opposing hood ends 64, the radial hood wall 62 having a hood length 66 (FIG. 7). The hood length 66 may be slightly longer than a length 68 of the radial side wall 58 so that the hood ends 64 may be vertically positioned along an outer surface 70 of the first and second ends 52, 54 of the barrel like structure 50 (see FIG. 7). The hood 14 may pivotably move about the pivot axis 42 at pivotable couplings defined in the opposing hood ends 64 of the hood 14. As such, as the hood 14 pivotably moves between the open and closed positions, the radial hood wall 62 of the hood 14 may move along an outer side 72 of the radial side wall 58 of the rear and top side 28, 36 of the barrel like structure 50 with the opposing hood ends 64 moveable along the outer surface 70 of the respective first and second ends 52, 54 of the barrel like structure 50. In this manner, the hood 14 may be associated with the barrel like structure 50 to close-off the cooking chamber 12 with the hood 14 in the closed position or to facilitate access to the cooking chamber 12 by moving the hood 14 to the open position. Such movement of the hood 14 may be manually employed with a handle 74 directly coupled to the radial hood wall 62 of the hood 14.

Figure 10:
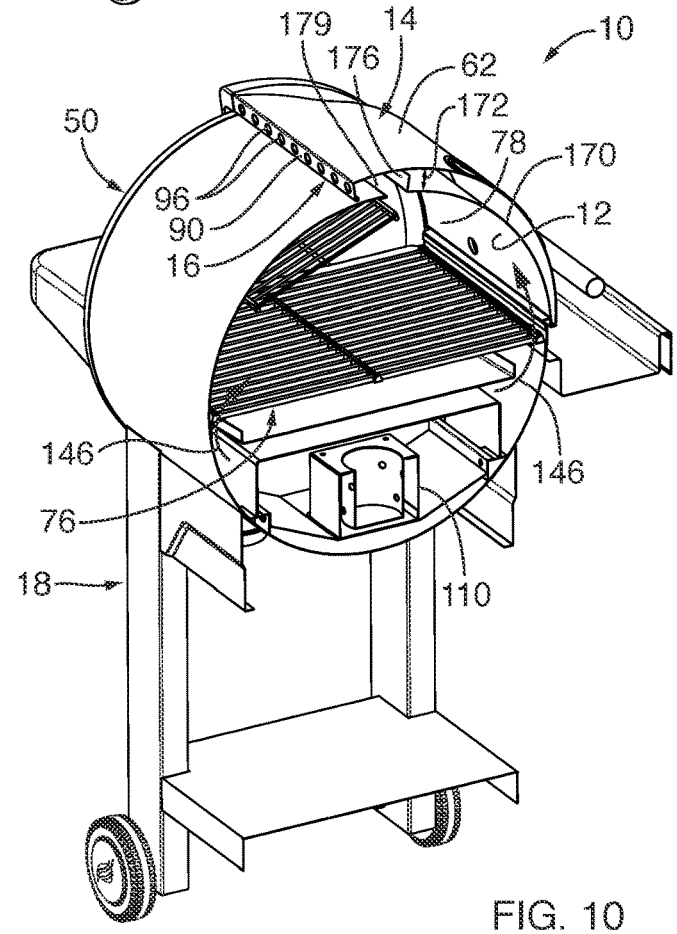
FIG. 10 is a perspective cross-sectional view of the cooking station depicted in FIG. 8, according to another embodiment of the present invention.

With reference to FIGS. 1 and 10, the cooking chamber 12 may be at least partially defined by the hood 14 and the main body 18 or an upper half of the barrel like structure 50. The cooking chamber 12 may include multiple racks or grills suspended therein for cooking food in the cooking chamber 12. For example, the multiple racks may include a main grill rack 76 and an upper grill rack 78. The main grill rack 76 may extend horizontally so as to divide the barrel like structure 50 between upper and lower halves or divide the cooking chamber 12 from the heat generating portion 24. The main grill rack 76 may be a single grill piece or multiple grill pieces suspended alongside each other resting on brackets, each of which may be manually lifted from the suspended position. The upper grill rack 78 may be moved between a horizontal use position (FIG. 12) and a pivoted position, discussed further herein.

With reference again to FIGS. 1 and 2, in one embodiment, the lower portion 22 of the main body 18 may include multiple legs 80, such as four legs, extending downward from the upper portion 20 of the main body 18 or from the barrel like structure 50. The legs 80 may each include wheels 82, such as caster wheels, adjacent ends thereof to facilitate portability of the cooking station 10. In another embodiment, at least two of the legs 80 may include wheels 82 associated therewith. The lower portion 22 of the main body 18 may include a lower shelf 84, the lower shelf 84 supported by the legs 80. In other embodiments, the lower portion 22 may include a cabinet like structure with one or more doors and/or drawers.

Now with reference to FIGS. 2 and 3, the vent portion 16 of the hood 14 will now be described. In one embodiment, the radial hood wall 62 may extend to a rear edge 90, the rear edge 90 extending between the opposing hood ends 64. Such rear edge 90 of the hood 14 may extend with a flat surface 92 that may extend perpendicular or substantially perpendicular relative to the opposing hood ends 64. Further, the rear edge 90 of the hood 14 may be elongated so as to define a longitudinal dimension that may define an edge axis 94, the edge axis 94 being parallel or substantially parallel with the pivot axis 42 (FIG. 1). The flat surface 92 of the rear edge 90 may define multiple vent openings 96 therein. The vent openings 94 may be aligned relative to each other and extend along most of the longitudinal length or dimension of the rear edge 90. In another embodiment, the vent openings 96 may be defined in the rear edge 90 in an aligned series of vent openings 96. Such vent openings 96 may be sized and configured to facilitate venting of heated smoke from the cooking chamber 12 (FIG. 1) of the cooking station 10, described in further detail herein.

Figure 3:
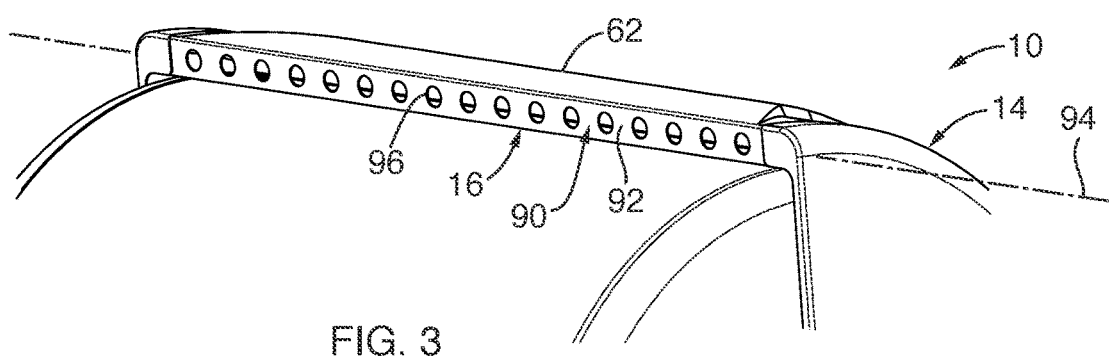
FIG. 3 is an enlarged perspective rear view of an upper portion of the cooking station, depicting a vent portion along a rear edge of the hood, according to another embodiment of the present invention.
Figures 4, 5:
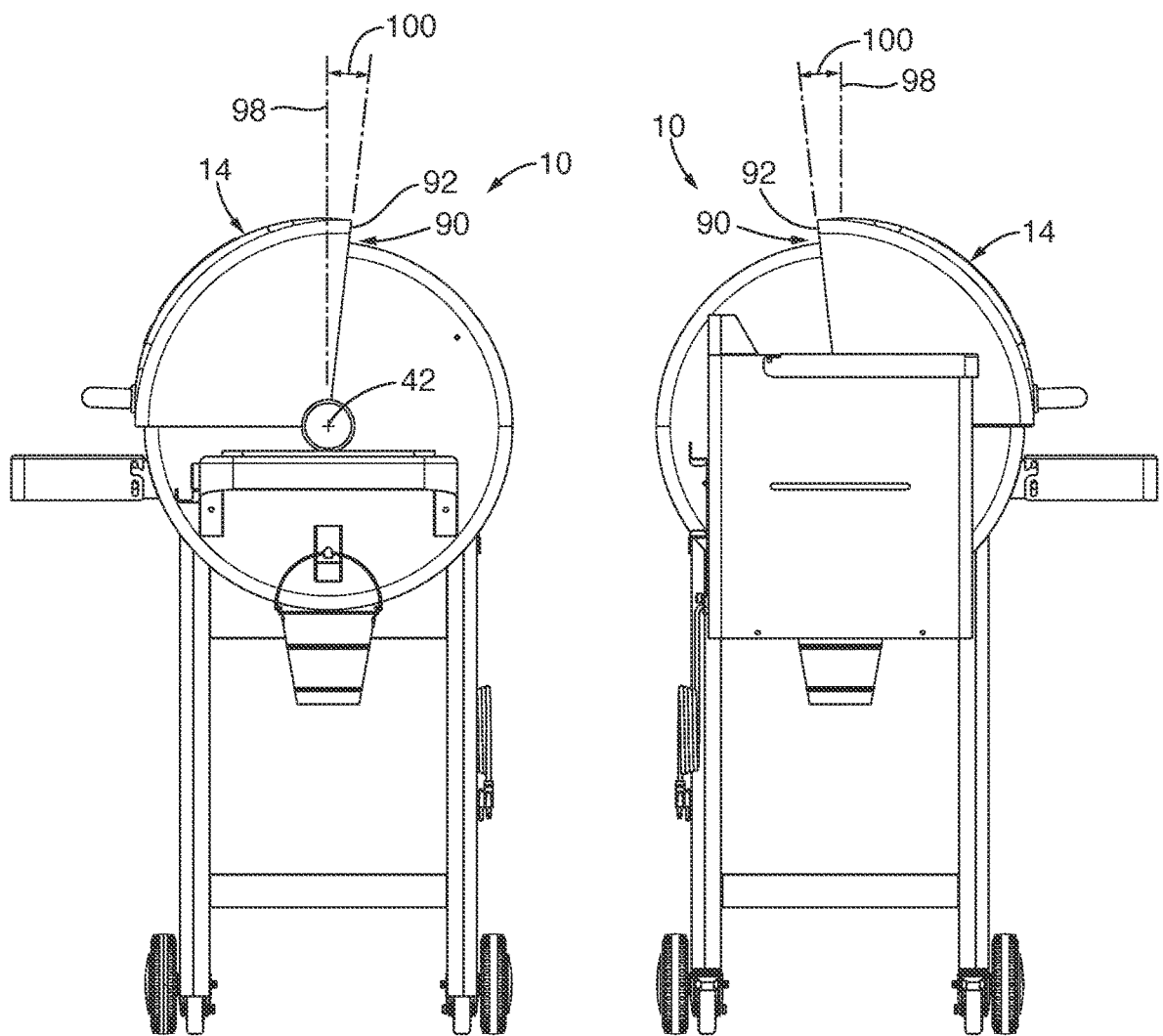
FIG. 4 is a right side view of the cooking station, according to another embodiment of the present invention.
FIG. 5 is a left side view of the cooking station, according to another embodiment of the present invention.

With reference to FIGS. 3, 4 and 5, upon the hood 14 of the cooking station 10 being in the closed position, the flat surface 92 of the rear edge 90 may be positioned in a predominately vertically extending orientation. As best shown in the side profile of FIGS. 4 and 5, the orientation may be slightly tipped or angled downward from the vertical (or a vertical plane 98 extending through the pivot axis 42) with an angle 100. Such angle 100 may be between about 1 and 25 degrees relative to the vertical. Further, such angle 100 of the flat surface 92 relative to the vertical may be considered a substantially vertical orientation. In another embodiment, the flat surface 92 of the rear edge 90 having an orientation with an angle 100 of less than 1 degree may be considered a substantially vertical orientation. The angled orientation of the flat surface 92, relative to the vertical, may be advantageous for the vent portion 16 and vent openings 96 so that, upon the hood 14 being in the closed position, the orientation of the vent portion 16 may minimize any potential foreign elements, such as rain water, from falling through the vent openings 96 of the vent portion 16. In other words, the angle 100 of the flat surface 92 relative to the vertical may assist in minimizing rain water from potentially entering the cooking chamber 12 when the hood 14 is in the closed position.

With reference to FIG. 10, the hood 14 may include multiple radially extending panels. As previously set forth, the hood 14 may include the radial hood wall 62 extending between the first and second hood ends 64. In addition to the radial hood wall 62, the hood 14 may include an underside radial hood wall 170 also extending between the first and second hood ends 64. The underside radial hood wall 170 may extend alongside the radial hood wall 62 with an air gap 172 therebetween. Such underside radial hood wall 170 may extend to at least partially define the underside of the hood 14 and the radial hood wall 62 may define the outside of the hood 14. The underside radial hood wall 170 may extend between a front edge 174 (FIG. 11) and an underside rear edge 176, each of the front edge 174 and the underside rear edge 176 extending between the first and second hood ends 64. The front edge 174 may extend directly from a hood front end 178 (FIG. 11) of the radial hood wall 62. The underside rear edge 176 may extend alongside the rear edge 90 or vent portion 16 of the hood 14 in a spaced apart manner. In one embodiment, upon the hood 14 being in the closed position, the rear edge 90 may extend along an outer surface of the radial side wall 58 such that the rear edge 90 may be set back from a front end 179 of the radial side wall 58. This set back from the front end 179 may further facilitate foreign elements, such as rain water, from falling toward the main grill rack 76 and the upper grill rack 78 within the cooking chamber 12.

Figure 6:
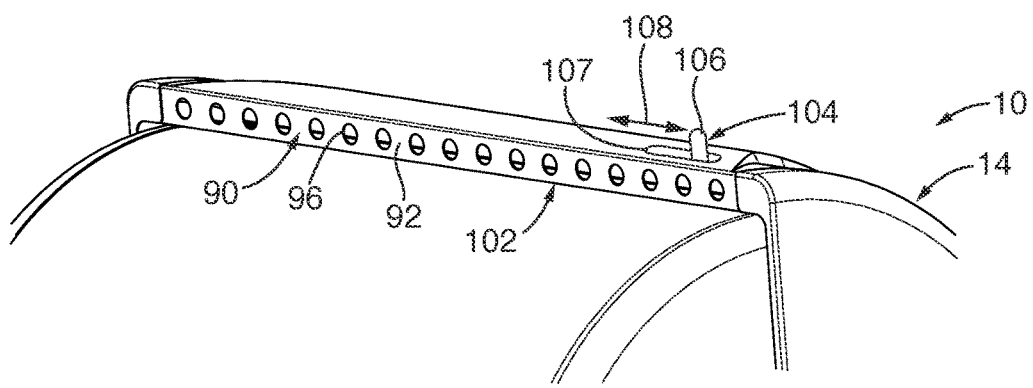
FIG. 6 is an enlarged perspective view of another embodiment of a vent portion along the rear edge of the hood of the cooking station, according to the present invention.

With respect to FIG. 6, another embodiment of a vent portion 102 of the cooking station 10 is provided. The vent portion 102 of this embodiment may include an adjustment mechanism 104 associated with the vent openings 96 defined in the rear edge 90 of the hood 14, similar to the embodiment of FIG. 3. In this embodiment, the adjustment mechanism 104 may include structure to facilitate minimizing a size of the vent openings 96 defined in the rear edge 90 of the hood 14. Such structure may be in the form of an elongate sliding member (not shown) with a tab 106 associated therewith, the tab 106 extending through a slot 107 defined in the hood 14 adjacent the rear edge 90. The tab 106 may be sized to manually move the sliding member linearly, as shown by arrow 108, to minimize the size of the vent openings 96. In this manner, the adjustment mechanism 104 may be a slide adjustment mechanism, and the elongate sliding member may be moveable to modify a size of the vent openings 96 defined in the rear edge 90 of the hood 14 so as to partially or fully block the vent openings 96. In one embodiment, the elongate sliding member may be positioned adjacently behind the rear edge 90 (or behind the rear flat surface 92) and within the hood 14 so that, upon moving the tab 106 along a slot. In another embodiment, the elongate sliding member may move to change the vent portion 102 between the limits of a fully open position and a partially open position. In another embodiment, the elongate sliding member may move to change the vent portion 102 between a fully open position and a closed position. Moving the tab 106 of the adjustment mechanism to completely close-off the vent openings 96 of the vent portion 102 or partially close-off the vent openings 96 of the vent portion 102 may be employed to minimize the available oxygen drawable into the heat generating portion 24. In some embodiments, partially closing the vent openings 96 or fully closing the vent openings 96 may assist in substantially extinguishing the burning embers or for substantially minimizing the temperature of the cooking chamber 12.

Figure 9:
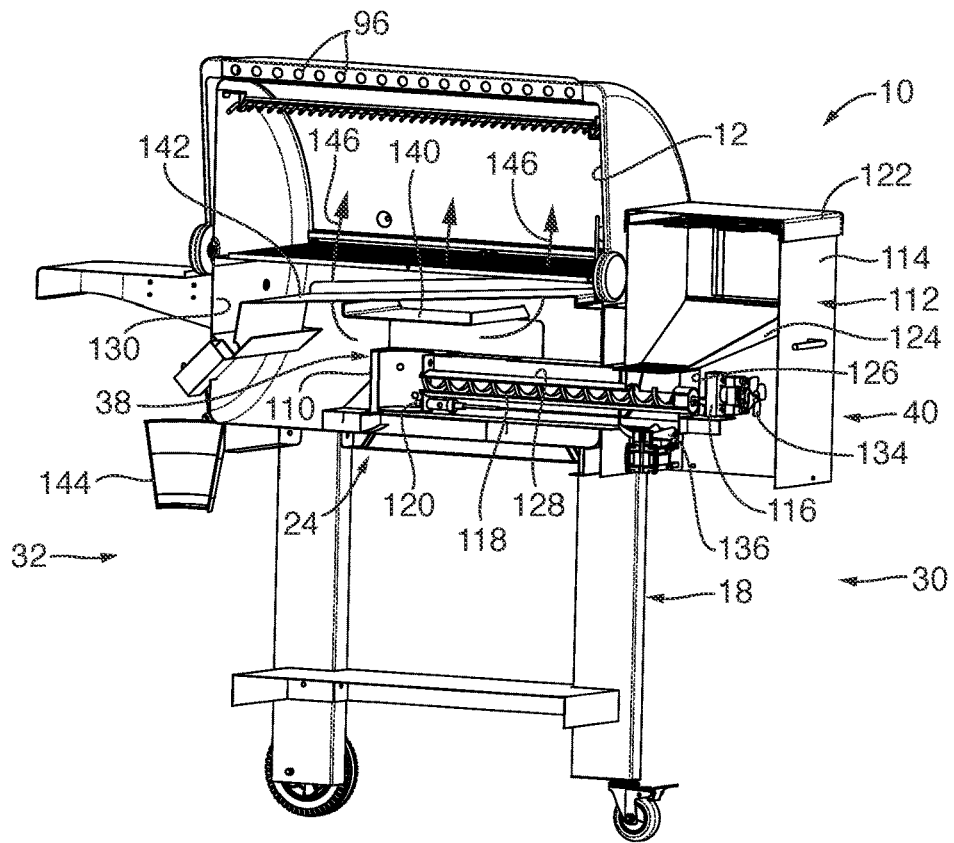
FIG. 9 is a perspective cross-sectional view of the cooking station depicted in FIG. 7, according to another embodiment of the present invention.

Now with reference to FIGS. 1, 7 and 9, the pellet feeding system 40 of the cooking station 10 will now be described. The pellet feeding system 40 may be coupled to the main body 18 of the cooking station 10 and may be similar to, and may incorporate features of, the pellet feeding systems disclosed in commonly owned U.S. patent application Ser. No. 16/428,605, filed on May 31, 2019, and U.S. patent application Ser. No. 17/337,310, filed on Jun. 2, 2021, the disclosures of which are incorporated herein in their entireties.

The pellet feeding system 40 may include typical components for controllably funneling pellets (not shown) to a fire pot 110 or holding structure 38 to generate heated smoke, as known to one of ordinary skill in the art. For example, in one embodiment, the pellet feeding system 40 may be powered with an electrical power chord 111 and include a housing 112, a pellet hopper 114, a motor 116, an auger 118, and a heating element 120, each of which cooperate together to feed pellets to the fire pot 110. The housing 112 may be positioned and coupled adjacent to one of the first and second sides 30, 32 of the cooking station 10. The housing 112 may house or contain the auger 118, the pellet hopper 114, the motor 116, as well as one or more fans. The pellet hopper 114 may include a lid 122 that may be opened to access the pellet hopper 114 and for filling the pellet hopper 114 with pellets (not shown). The pellet hopper 114 may extend with a slanted wall 124 to facilitate funneling pellets toward and into a pellet outlet 126. The pellet outlet 126 may extend to one end portion of the auger 118. The auger 118 may be positioned within a tube housing 128 extending from the housing 112 and to the fire pot 110. The tube housing 128 for the auger 118 and the fire pot 110 may be positioned within the heat generating portion 24 of the main body 18 of the cooking station 10 or within a lower barrel portion 130 of the barrel like structure 50 of the main body 18. The auger 118 may be rotated about an auger axis 132 with the motor 116 such that the auger 118 may be sized and configured to move pellets along the auger axis 132 to the fire pot 110. Further, the heating element 120 may be positioned below the auger 118 with one end extending into the fire pot 110. Such heating element 120 may be elongated with the one end positioned in the fire pot 110 and being electrically heated, commonly referenced as a hot rod. Further, the pellet feeding system 40 may include, for example, a first fan 134 and a second fan 136. The first fan 134 may be employed for cooling the motor 116 and the second fan 136 may be employed for fanning hot embers in the fire pot 110 by flowing air alongside the tube housing 128 and through holes defined in walls of the fire pot 110 so as to provide oxygen to the embers formed by the heating element 120 contacting the pellets. With this arrangement, the auger 118 rotates to drive pellets through the tube housing 128 and along the auger axis 132 such that the pellets move from the pellet outlet 126 of the pellet hopper 114 to the fire pot 110. Such feeding of pellets may be controlled with a control system having a controller and a temperature sensor so that a user can control the temperature of the cooking chamber, as known to one of ordinary skill in the art, and as disclosed in the above-noted commonly owned patent applications, incorporated by reference herein.

With reference to FIGS. 7, 8, 9 and 10, as previously set forth, the fire pot 110 may be positioned within the heat generating portion 24 of the main body 18 and below the cooking chamber 12 of the cooking station 10. Further, the fire pot 110 may be centrally positioned below the cooking chamber 12 and below the main grill rack 76. The fire pot 110 may also be positioned below a flame shield 140 and a drip pan 142 such that the flame shield 140 may extend between the fire pot 110 and the drip pan 142. The flame shield 140 may be sized and configured to minimize flames that may be generated in the fire pot 110 from reaching the cooking chamber 12. Such drip pan 142 may also assist in minimizing flames generated in the fire pot 110 from entering the cooking chamber 12. The drip pan 142 may be slanted downward toward a grease container 144, the grease container 144 positioned along one of the first and second sides 30, 32 of the cooking station 10. Further, the drip pan 142 may be positioned directly below the main grill rack 76 so that, as food is being cooked on the main grill rack 76 in the cooking chamber 12, drippings from such food may be caught on the drip pan 142. Further, the drip pan 142 may include upward extending side walls to ensure funneling any food byproduct into the grease container 144. As heated smoke is generated in the fire pot 110 via the pellet feeding system 40, the heated smoke may move around the flame shield 140 and upward along the drip pan 142 to then move around the drip pan 142 and move through peripheral portions of the main grill rack 76 and into the cooking chamber 12, as shown by arrows 146. Upon the cooking chamber 12 being filled with the heated smoke, such heated smoke may penetrate and cook the food positioned in the cooking chamber 12 and the heated smoke may exit the cooking station through the vent openings 96 defined in the rear edge 90, as previously set forth.

Figure 8:
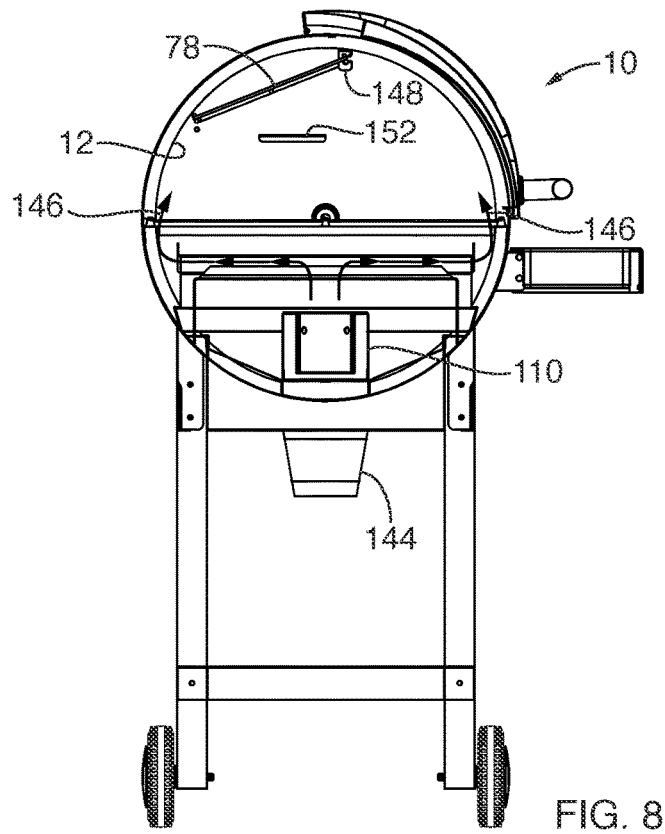
FIG. 8 is a cross-sectional view of the cooking station taken along section line B-B of FIG. 2, depicting various components of the cooking station and a flow path for heated smoke, according to another embodiment of the present invention.
Figure 11:
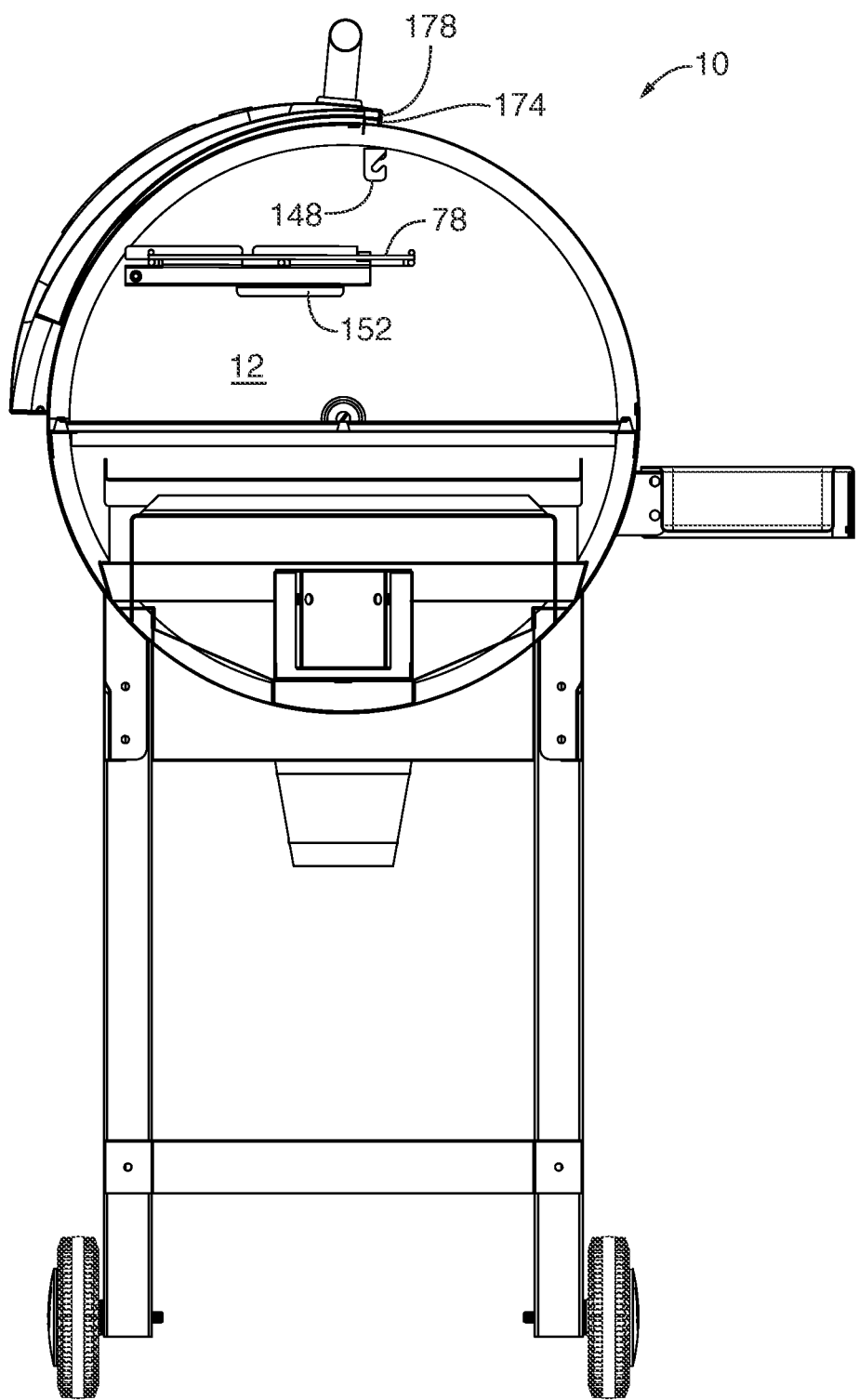
FIG. 11 is a cross-sectional side view of the cooking station similar to FIG. 8, depicting an upper grill rack in a horizontal use position, according to another embodiment of the present invention.
Figure 12:
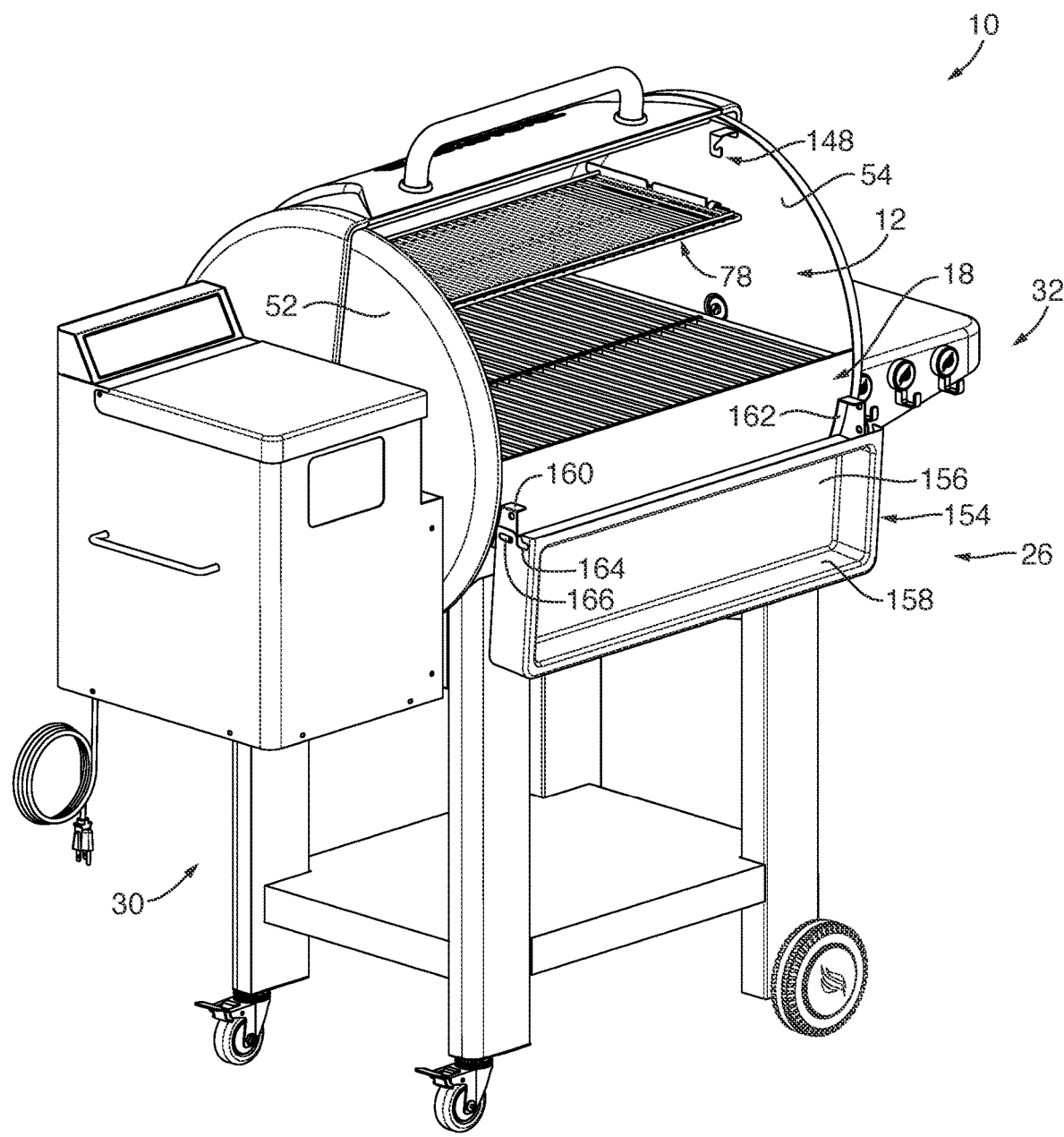
FIG. 12 is a perspective front view of the cooking station of FIG. 1, depicting a tray in a pivoted position and the upper grill rack in the horizontal use position, according to another embodiment of the present invention.

Now with reference to FIGS. 1, 8, 11 and 12, as previously set forth, the upper grill rack 78, positioned within the cooking chamber 12 of the cooking station 10, may be moved from the horizontal use position to the pivoted position. The horizontal use position, as depicted in FIGS. 11 and 12, provides additional rack space for placing food such that food may be placed on the main grill rack 76 and the upper grill rack 78. In the event that a larger food item is being employed in the cooking chamber 12, the upper grill rack 78 may be moved to a pivoted position, as depicted in FIGS. 1 and 8. The upper grill rack 78 may be moved to the pivoted position by lifting upward on a front end of the upper grill rack 78 so that the upper grill rack 78 pivots to the upward pivoted position. The upper grill rack 78 may then be positioned adjacent a hook 148 extending from a ceiling or inner surface of the first and/or second ends 52, 54 of the cooking chamber 12 such that, upon being positioned adjacent the hook 148, a front portion of the upper grill rack 78 may be manually pushed into the hook 148 so that the front portion nests with the hook 148. Reverse steps may be employed for moving the upper grill rack 78 from the pivoted position and back to the horizontal use position. That is, a manual force may be applied to the front portion of the upper grill rack 78 to disengage the front portion of the upper grill rack 78 from the hook 148. The user may then simply pivot the upper grill rack 78 to the horizontal use position so that the upper grill rack 78 is positioned over and suspended by tabs 152 or brackets positioned on opposing inner surfaces of the respective first and second ends 52, 54 of the barrel like structure 50. In this manner, the upper grill rack 78 in the cooking chamber 12 may be manually moved to horizontal or pivoted positions, as desired.

With reference to FIGS. 1 and 12, in another embodiment, a tray 154 positioned along the front side 26 of the cooking station 10 may be moved between a use position and a pivoted position (pivoted downward), the pivoted position being a storage position or more compact position for storage. The tray 154 may extend with a bottom wall 156 and one or more side walls 158 extending upward from the bottom wall 156. The tray 154 may be coupled to the main body 18 of the cooking station 10 with a first extension 160 and a second extension 162, the first extension 160 extending from adjacent the first side 30 and from the front side 26 of the main body 18 and the second extension 162 extending from adjacent the second side 32 and from the front side 26 of the main body 18. Each of the first and second extensions 160, 162 may include two pins extending therefrom, the two pins sized and configured to correspond with upper and lower slots 164, 166 defined in the side wall 158 of the tray 154. The upper slot 164 may have an open end and the lower slot 166 may be elongated, the lower slot 166 sized to maintain one of the two pins therein. The tray 154 may be moved to the pivoted position by moving the tray 154 vertically upward and then pivoting the tray 154 downward so that the upper one of the two pins moves out of open end of the upper slot 164. The tray 154 may be moved from the pivoted position to the use position by simply pivoting the tray 154 upward so that the upper one of the two pins is inserted into the upper slot 164 and then the tray 154 may be moved vertically downward so that the tray 154 may be suspended by the two pins in the use-position.

The various structural components of the cooking station 10, as known to one of ordinary skill in the art, may be formed of various metallic materials, such as steel, stainless steel, copper, aluminum or any other suitable material with high temperature ratings, such as various suitable polymeric materials, and may be formed from known structural components, such as sheet metal at various gauges/thicknesses or other known metallic structures, such as tubing or the like, and may be formed and manufactured through various known processes and techniques known in the art, such as casting, welding, rolling, bending, pressing, fastening, etc., as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An outdoor cooking station configured to be heated with smoke, the outdoor cooking station comprising:
   a main body extending to define a front side, a rear side, a left side and a right side each extending from a lower end to a cooking chamber, the cooking chamber being an upper portion of the main body, the cooking chamber having a cooking surface, the main body including a heat generating portion sized and configured to burn fuel to provide heated smoke to the cooking chamber, the main body including a radial wall extending above and at least partially over the cooking surface, the radial wall of the main body extending between a left wall and a right wall and the radial wall defining a central axis extending between the left and right walls; and
   a hood with a radial hood wall extending between hood ends, the hood rotatably coupled to the main body about a pivot axis, the pivot axis being co-axial with the central axis of the main body, the radial hood wall of the hood corresponding with the radial wall of the main body so that the radial hood wall is movable over an external side of the radial wall of the main body as the hood moves between an open position and a closed position, the hood including a rear edge having a vent portion with openings defined therein, the vent portion sized and configured to facilitate venting smoke from the cooking chamber, wherein the rear edge comprises a surface with the openings defined therein such that, upon the hood being in the closed position, the surface extends in a substantially vertical orientation, wherein the substantially vertical orientation of the surface comprises an angle of about 1 to 15 degrees relative to the vertical.

2. The outdoor cooking station of claim 1, wherein the rear edge comprises the surface with the openings defined therein such that, upon the hood being in the closed position, the surface faces rearward and, upon the hood being in the open position, the surface faces downward.

3. The outdoor cooking station of claim 1, wherein, upon the hood being in the closed position, the vent portion of the rear edge of the hood extends between the left and right sides of the main body such that the rear edge extends directly over a top portion of the radial wall.

4. The outdoor cooking station of claim 1, wherein the openings defined in the rear edge are adjustable relative to a size of the openings.

5. The outdoor cooking station of claim 1, wherein the radial hood wall of the hood extends with a radially extending inner wall so as to define an air gap between the radial hood wall and outer wall and the radially extending inner wall, the radially extending inner wall extending to an underside rear edge such that the underside rear edge closes-off the air gap from the cooking chamber, the underside rear edge being spaced from the rear edge so that the openings of the rear edge vent smoke directly from the cooking chamber.

6. The outdoor cooking station of claim 1, wherein the heat generating portion comprises a pellet feeding system coupled to the main body.

7. The outdoor cooking station of claim 1, wherein the cooking surface within the cooking chamber comprises a grill type surface.

8. The outdoor cooking station of claim 1, wherein the cooking surface within the cooking chamber comprises a main grill rack and an upper grill rack, the upper grill rack being moveable between a horizontal position and a pivoted position.

9. An outdoor cooking station configured to be heated with smoke, the outdoor cooking station comprising:

a main body extending to define a barrel like structure defining a centrally extending axis, the barrel like structure having a radial wall extending between two opposing end walls, the two opposing end walls being oriented vertically, the barrel like structure including a cooking chamber and a heat generating portion, the heat generating portion configured to burn fuel to provide heated smoke to the cooking chamber, the radial wall of the barrel like structure defining an opening therein such that the opening is defined along a front side of the barrel like structure to provide access to the cooking chamber and such that the radial wall extends above and at least partially over a cooking surface within the cooking chamber; and a hood with a radial hood wall extending between hood wall ends, the hood pivotably coupled to the main body to facilitate pivoting the hood about a pivot axis, the pivot axis being co-axial with the centrally extending axis of the main body, the radial hood wall of the hood corresponding with the radial wall of the main body so that the radial hood wall is movable over an external side of the radial wall of the main body as the hood moves between an open position and a closed position, the hood including a rea r edge having a vent portion with openings defined therein, the vent portion sized and configured to facilitate venting smoke from the cooking chamber, wherein the rear edge comprises a surface with the openings defined therein such that, upon the hood being in the closed position, the surface extends in a substantially vertical orientation, wherein the substantially vertical orientation of the surface comprises an angle of about 1 to 15 degrees relative to the vertical.

10. The outdoor cooking station of claim 9, wherein the rear edge comprises the surface with the openings defined therein such that, upon the hood being in the closed position, the surface faces rearward and, upon the hood being in the open position, the surface faces downward.

11. The outdoor cooking station of claim 9, wherein the openings defined in the rear edge are adjustable relative to a size of the openings.

12. The outdoor cooking station of claim 9, wherein the radial hood wall of the hood extends with a radially extending outer wall and a radially extending inner wall so as to define an air gap between the radial hood wall and the radially extending inner wall, the radially extending inner wall extending to an underside rear edge such that the underside rear edge closes-off the air gap from the cooking chamber, the underside rear edge being spaced from the rear edge so that the openings of the rear edge vent smoke directly from the cooking chamber.

13. The outdoor cooking station of claim 9, wherein the heat generating portion comprises a pellet feeding system coupled to the main body.

14. The outdoor cooking station of claim 9, wherein the cooking chamber comprises a main grill rack and an upper grill rack, the upper grill rack being moveable between a horizontal position and a pivoted position.

* * * * *